(12) United States Patent
Lowell et al.

(10) Patent No.: US 10,042,687 B2
(45) Date of Patent: Aug. 7, 2018

(54) PAIRED VALUE COMPARISON FOR REDUNDANT MULTI-THREADING OPERATIONS

(71) Applicant: Advanced Micro Devices, Inc., Sunnyvale, CA (US)

(72) Inventors: Daniel I. Lowell, Austin, TX (US); Manish Gupta, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 184 days.

(21) Appl. No.: 15/231,251

(22) Filed: Aug. 8, 2016

(65) Prior Publication Data

US 2018/0039531 A1    Feb. 8, 2018

(51) Int. Cl.
*G06F 11/14* (2006.01)
*G06F 11/07* (2006.01)
*G06F 9/30* (2018.01)
*G06F 9/38* (2018.01)

(52) U.S. Cl.
CPC ...... *G06F 11/0763* (2013.01); *G06F 9/30101* (2013.01); *G06F 11/0721* (2013.01); *G06F 9/3887* (2013.01)

(58) Field of Classification Search
CPC ............. G06F 11/0724; G06F 11/1633; G06F 11/1637; G06F 11/14; G06F 11/1497
USPC ..................................................... 714/11, 10
See application file for complete search history.

(56) References Cited

U.S. PATENT DOCUMENTS

| 9,026,847 | B2 | 5/2015 | Sridharan et al. | |
| 9,047,192 | B2 | 6/2015 | Sridharan et al. | |
| 9,274,904 | B2 | 3/2016 | Lyashevsky et al. | |
| 9,367,372 | B2 | 6/2016 | Lyashevsky et al. | |
| 2006/0095821 | A1* | 5/2006 | Mukherjee | G06F 11/1494 714/736 |
| 2006/0150186 | A1* | 7/2006 | Grayver | G06F 11/1494 718/102 |

(Continued)

OTHER PUBLICATIONS

Reinhardt, Steven K., et al, "Transient Fault Detection via Simultaneous Multithreading", Proceedings of the 27th Annual International Symposium on Computer Architecture, Jun. 10-14, 2000, pp. 25-36, ACM, Vancouver, BC, Canada.

(Continued)

*Primary Examiner* — Chae M Ko
(74) *Attorney, Agent, or Firm* — Volpe and Koenig, P.C.

(57) ABSTRACT

Techniques for performing redundant multi-threading ("RMT") include the use of an RMT compare instruction by two program instances ("work-items"). The RMT compare instruction specifies a value from each work-item to be compared. Upon executing the RMT compare instructions, the work-items transmit the values to a hardware comparator unit. The hardware comparator unit compares the received values and performs an error action if the values do not match. The error action may include sending an error code in a return value back to the work-items that requested the comparison or emitting a trap signal. Optionally, the work-items also send addresses for comparison to the comparator unit. If the addresses and values match, then the comparator stores the value at the specified address. If either or both of the values or the addresses do not match, then the comparator performs an error action.

20 Claims, 5 Drawing Sheets

(56) References Cited

U.S. PATENT DOCUMENTS

| | | | | |
|---|---|---|---|---|
| 2008/0016393 A1* | 1/2008 | Bose | ............... | G06F 11/1497 714/38.14 |
| 2010/0088702 A1* | 4/2010 | Dern | ............... | G06F 9/528 718/101 |
| 2010/0169582 A1* | 7/2010 | Hinton | ............... | G06F 12/0817 711/146 |
| 2010/0169628 A1* | 7/2010 | Hinton | ............... | G06F 9/3891 712/244 |
| 2012/0036398 A1* | 2/2012 | Moyer | ............... | G06F 9/505 714/48 |
| 2017/0364332 A1* | 12/2017 | Lowell | ............... | G06F 8/30 |
| 2017/0371743 A1* | 12/2017 | Kalamatianos | ............... | G06F 11/1064 |

OTHER PUBLICATIONS

Mukherjee, Shubhendu S., et al, "Detailed Design and Evaluation of Redundant Multithreading Alternatives", Proceedings of the 29th Annual International Symposium on Computer Architecture, May 25-29, 2002, pp. 99-110, IEEE, Anchorage, AK, USA.

Smolens, Jared C. et al, "Fingerprinting: Bounding Soft-Error Detection Latency and Bandwidth", Proceedings of the 11th International Conference on Architectural Support for Programming Languages and Operating Systems, Oct. 7-13, 2004, pp. 224-234, ACM, Boston, MA, USA.

Wadden, Jack et al., "Real-World Design and Evaluation of Compiler-Managed GPU Redundant Multithreading", ACM/IEEE 41st International Symposium on Computer Architecture, Jun. 14-18, 2014, pp. 73-84, IEEE, Minneapolis MN, USA.

* cited by examiner

PAIRED VALUE COMPARISON FOR REDUNDANT MULTI-THREADING OPERATIONS

TECHNICAL FIELD

The disclosed embodiments are generally directed to error detection of computer computation results, and in particular, to paired value comparison for redundant multi-threading operations.

BACKGROUND

Redundant multi-threading is a technique in which a program is executed multiple times to help detect and/or prevent errors that can lead to corruption of calculation values. Errors may include soft errors, in which a bit flip occurs in a storage element due to structural, electrical, or environmental factors. Execution of a program only a single time does not provide the inherent ability to detect such errors. The redundant multi-threading technique allows for detection of such errors because if the same program is executed two or more times, that program should produce the same result and if the results are not identical, it can be assumed that an error has occurred.

BRIEF DESCRIPTION OF THE DRAWINGS

A more detailed understanding may be had from the following description, given by way of example in conjunction with the accompanying drawings wherein.

DETAILED DESCRIPTION

The present disclosure is directed to techniques for performing redundant multi-threading ("RMT") to detect errors that indicate corruption of working data. These techniques include the use of an RMT compare instruction by two program instances (referred to herein as "work-items"). The RMT compare instruction specifies a value from each work-item to be compared. A mismatch in these values means that an error is deemed to have occurred. Upon executing the RMT compare instructions, the work-items transmit the values for comparison to a hardware comparator unit. The hardware comparator unit is configured to compare the received values and perform an error action if the values do not match. The error action includes one of sending an error code in a return value back to the work-items that requested the comparison and emitting a trap signal to stop execution of the work-items and cause a fault handler to execute.

In some approaches, the RMT compare instructions also specifies addresses for comparison, in addition to specifying the values for comparison. The addresses for comparison represent addresses to which the value is to be stored if the comparison is successful. Upon executing RMT compare instructions that specify addresses for comparison, the work-items transmit the addresses for comparison, as well as the values for comparison, to the hardware comparator unit. The hardware comparator unit compares the addresses and the values and performs an error action if the addresses or values do not match. If the values and addresses do match, the hardware comparator unit stores the value at the address specified.

Figure 1:
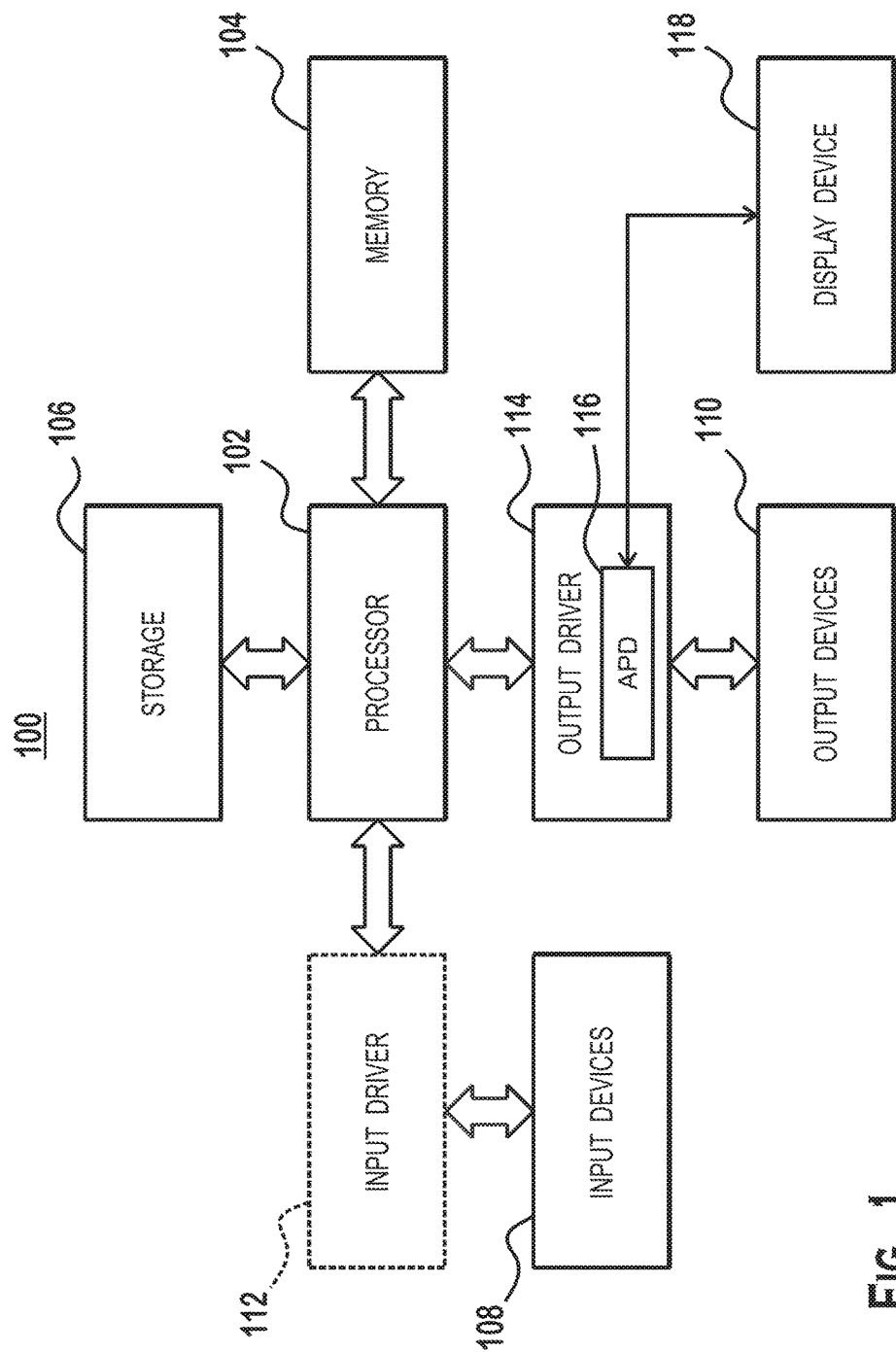
FIG. 1 is a block diagram of an example device in which one or more disclosed embodiments may be implemented.

FIG. 1 is a block diagram of an example device 100 in which one or more disclosed embodiments may be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core is a CPU or a GPU. The memory 104 may be located on the same die as the processor 102, or may be located separately from the processor 102. The memory 104 includes a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, the functionality described as being performed by the APD 116 may also be performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm may perform the functionality described herein.

Figure 2:
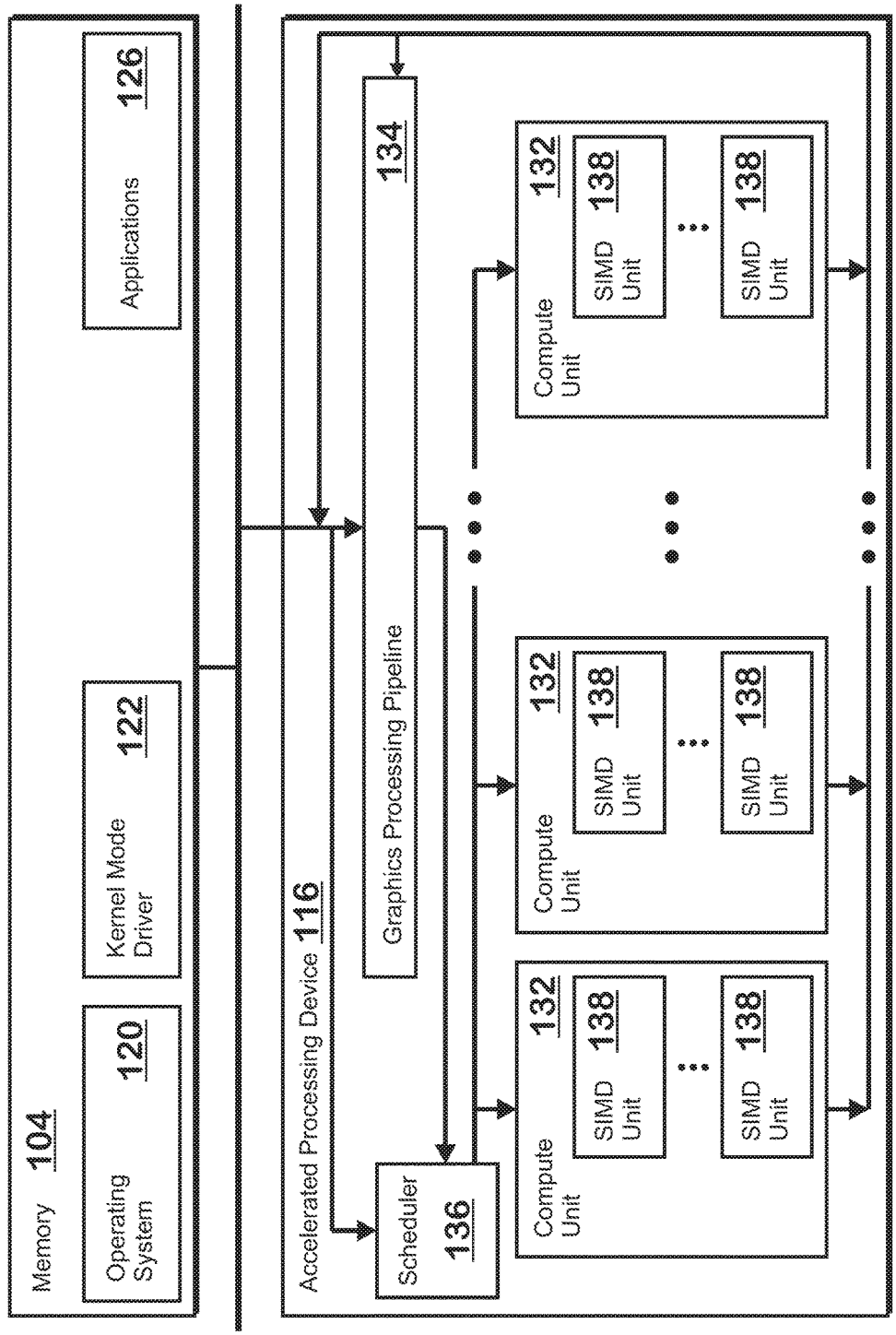
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various aspects of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. Multiple wavefronts may be included in a "work group," which includes a collection of work-items designated to execute the same program. A work group can be executed by executing each of the wavefronts that make up the work group. The wavefronts may be executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. A graphics pipeline 134 which accepts graphics processing commands from the processor 102 may thus provide computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

RMT is a computing scheme whereby a single logical program flow is executed multiple times in order to provide error detection. Because execution of any particular instruction may result in "soft errors" (e.g., due circuit bombardment with radiation, thermal variations, random fluctuations, signal integrity problems, or other problems) that result in an incorrect result value, executing the same instruction redundantly in two different programs provides the opportunity to verify the correctness of a result by determining whether the two (or more) values that result from the redundant computation results are equal. If the results of redundant computations are equal, then it can be determined, to a high degree of certainty, that the results are correct. If the results are not equal, then it can be determined that an error in computation has occurred.

The parallel nature of the compute units 132 affords a unique ability to perform RMT in an efficient manner. For example, because the compute units 132 may have a SIMD architecture, the compute units 132 are "natively" able to execute the same program redundantly with different items of data (understanding, of course, that with RMT, the "different" items of data may be duplicated data).

To perform such parallel computation, a program may designate two work-items to execute that program. The APD 116 executes the program with the two work-items. The program, itself, includes instructions to verify that certain critical data produced by both work-items is the same, and may also include instructions that execute in the situation that such data is not identical (which would, presumably, mean that a "soft error" has occurred as described above).

One issue with RMT in a SIMD architecture is that performing the verification step is not necessarily a straightforward task. Instructions may be required, for example, to force threads to run redundantly, to force values to be compared, and to handle the result of such comparisons, all of which may be cumbersome for a programmer to introduce into a program.

However, with a small amount of hardware assistance, the verification step can be performed in a much less cumbersome manner, and in a manner that reduces the difficulty and complexity involved in writing programs for performing RMT. Specifically, the compute unit 132 and SIMD units 138 support a compare instruction that compares values across "paired" work-items executing within the compute unit 132. The compare instruction accepts, as input, a value to be compared, and a "pairing number" that identifies the pair of work-items for which the comparison is to be performed.

Figure 3:
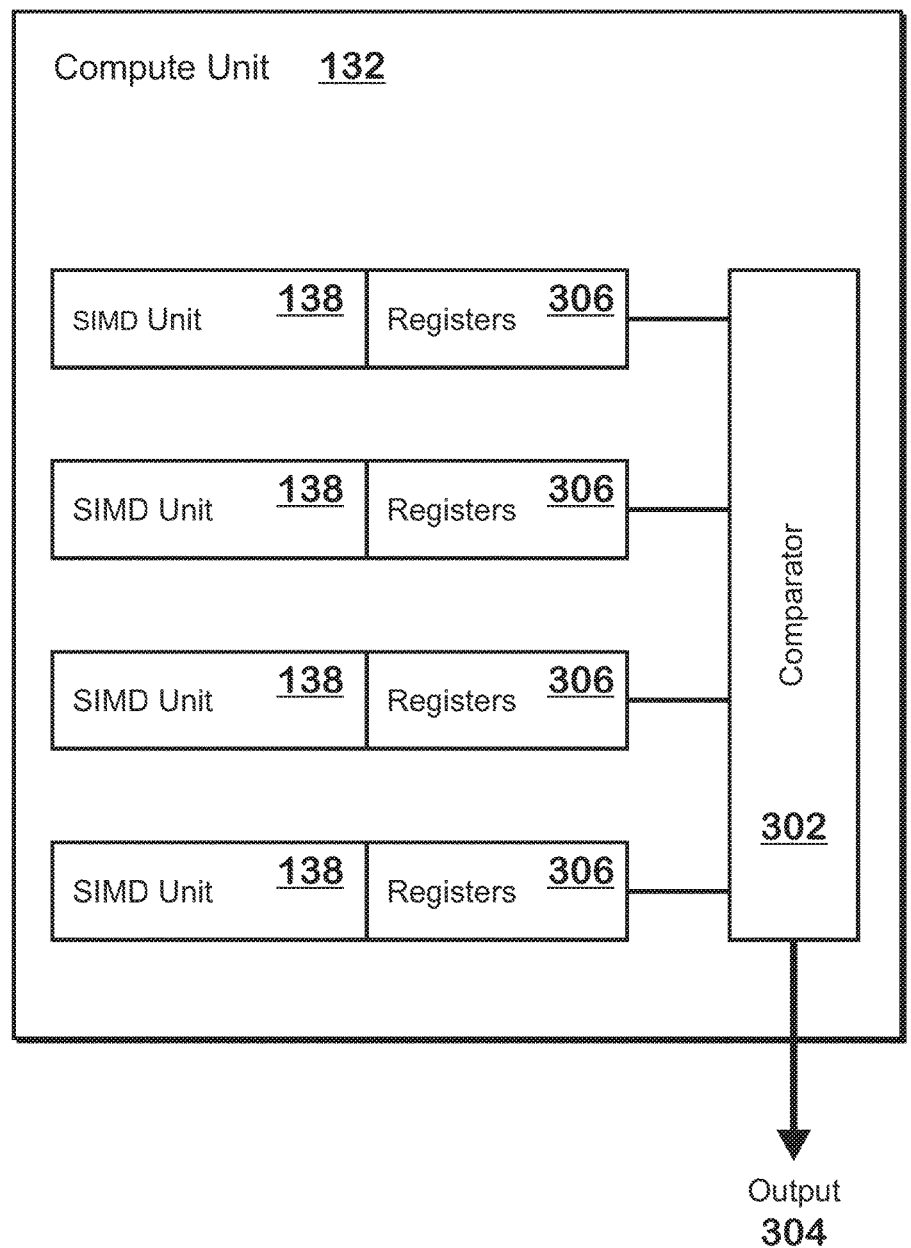
FIG. 3 is a block diagram of a compute unit of the device of FIG. 1, illustrating a comparator in communication with single-instruction-multiple-data ("SIMD") units.

FIG. 3 is a block diagram of the compute unit 132 illustrating a comparator 302 in communication with multiple SIMD units 138. Upon executing an appropriate instruction (deemed an "RMT compare instruction" here), a work-item executing in a SIMD unit 138 transmits a value to the comparator 302 for comparison. Each work-item that executes the RMT compare instruction transmits such a value. In response to receiving values for comparison from two work-items, the comparator 302 compares the two values and performs a resulting action in response. The resulting action includes one or more of the following actions: returning an error code to the thread that requested execution of the RMT compare instruction, the error code indicating whether the values are equal, asserting a trap signal to cause error handling instructions to execute, if the values are not equal, and storing the compared value at an address in memory indicated by the RMT compare instruction, if the values are equal.

Several example RMT instructions are now described. These RMT instructions are illustrated in the C++ language. However, it should be understood that use of the C++ language is for purposes of illustration only. The present disclosure contemplates that similar instruction/function types may be invoked from any computer programming language.

A first RMT compare instruction is represented in C++ as follows:

```
template<typename V> int ret_cmpstore(V value, unsigned int pair); //First compare instruction
```

This first compare instruction accepts a value of type V and name "value," which can be of any type, and a pairing number. The variable "V value" is the value to compare and the pairing number is a mechanism that identifies values that are to be paired. Invoking an RMT compare instruction with the same pairing value on two different work-items informs the comparator 302 that the values received from those invocations of the RMT compare instruction are to be compared. This pairing number mechanism allows the comparator 302 to correctly identify which values are to be compared regardless of any relationship (or lack thereof) between the work-items from which the values are received. The integer ("int") return value in an error code that indicates whether the comparison was successful (the two values are equal) or failed (the two values are different). Although any set of return values can be used, in one example, the return value for success may be a "1" and for failure may be a "0."

This first compare instruction is executed by two work-items. The two work-items may be executing as part of the same wavefront on the same SIMD unit 138, or as part of different wavefronts on the same or different SIMD units 138. Upon execution of the first compare instruction, with a first pairing value, by one work-item, the SIMD unit 138 executing that work-item transmits the value of "V value" to the comparator 302 for comparison. Similarly, upon execution of the first compare instruction by another work-item, with the same pairing value, the SIMD unit 138 executing that work-item transmits the value of "V value" to the comparator 302 for comparison. Because the pairing values for the two compare instructions are the same, the comparator 302 compares the two received values and produces a result. If the two values for comparison are the same, then the result indicates a success and the comparator 302 transmits that result as the return value to both of the work-items that executed the RMT compare instruction. If the two values are not the same, then the result indicates a failure and the comparator 302 transmits that result as the return value to both of the work-items that executed the RMT compare instruction.

Each SIMD unit 138 includes or is assigned a set of local registers 306. These local registers 306 are used as a scratch space by work-items executing in the SIMD unit 138 associated with the set of local registers. Features of the local registers 306, such as physical proximity, connection type, and the like, allow for local work-items to access such registers more quickly than a more distant memory space. Other blocks of memory, such as shared registers (not shown in FIG. 3), or more distant, general memory spaces, are also accessible to work-items, but accessing such memory may incur performance penalties such as greater latency, lower throughput, or the like. Any particular register in the set of local registers 306 may be assigned for use by a particular work-item executing in the SIMD unit 138 associated with the set of local registers 306.

Note that the variable "V value" may refer to a value stored in a local register assigned to the work-item that invokes the RMT compare instruction. Thus, if two work-items simultaneously executing in a single SIMD unit 138 both execute the RMT compare instruction with the same pairing value, those two work-items may transmit values from different registers assigned to the same SIMD unit 138.

A second RMT compare instruction is represented in C++ as follows:

```
template<typename V, typename A> int ret_cmpstore(V value, A address, unsigned int pair); //Second compare instruction
```

This second RMT compare instruction is similar to the first RMT compare instruction except that in addition to "V value," an address "A address" is provided as well. Note that the type "A" of variable "A address" is a generic type (indicated by the typename keyword), but it is contemplated that this type has a type of pointer to the type of the variable "V value," and thus could act as an address for "V value." Providing the address allows the comparator to 302 verify the address to which the value of "V value" is to be stored. More specifically, if both work-items performing the RMT operations calculate the same address to which to store "V value," then it is determined to a high degree of certainty that the address is "correct," and if the work-items calculate two different addresses, then it is determined that an error has occurred. In addition, providing the address also allows the value of "V value" to be committed to memory at the address "A address" if both "V value" and "A address" are identical.

Execution of the second RMT compare instruction by the SIMD units 138 is similar to execution of the first RMT compare instruction except that instead of only receiving the value of "V value" from both work-items, the comparator 302 also receives the address "A address" from both work-items and compares the received addresses. If the received values and addresses are identical, then the comparator 302 returns a result to both work-items corresponding to a success and also commits "V value" to the address "A address." If either the values or addresses do not match, then the comparator 302 returns a result indicating failure to both work-items and does not commit the value of "V value" to memory.

Third and fourth RMT compare instructions are similar to the first RMT compare instruction and second RMT compare instruction, respectively, except that instead of using a return mechanism, the second and third RMT compare instruction both trigger a trap signal if an error occurs (e.g., if the values of "V value" and/or addresses "A address" do not match). The third and fourth RMT compare instructions are expressed in C++ as follows:

```
template<typename V> void sig_cmpstore(V value, unsigned int pair); //Third compare instruction
template<typename V, typename A> void sig_cmpstore(V value, A address, unsigned int pair); //Fourth compare instruction
```

The third compare instruction corresponds to, and is similar in functionality to, the first compare instruction. The only difference is that instead of returning a result to both work-items indicating whether the compare operation succeeded or failed, the third compare instruction emits a trap signal if the compare operation failed. The trap signal triggers appropriate fault handling code that may be pre-installed in the APD 116 at the request of, for example, the kernel mode driver 122. Similarly, the fourth compare instruction corresponds to, and is similar in functionality to, the second instruction. As with the third instruction, the only difference is that instead of retuning a result, the fourth compare instruction emits a trap signal if the compare operation for either or both of the value of "V value" or the address "A address" fails. For either the third or fourth compare instruction, a failed comparison stops execution of the work-items that invoked the compare instructions that caused the failed comparison.

Figure 4:
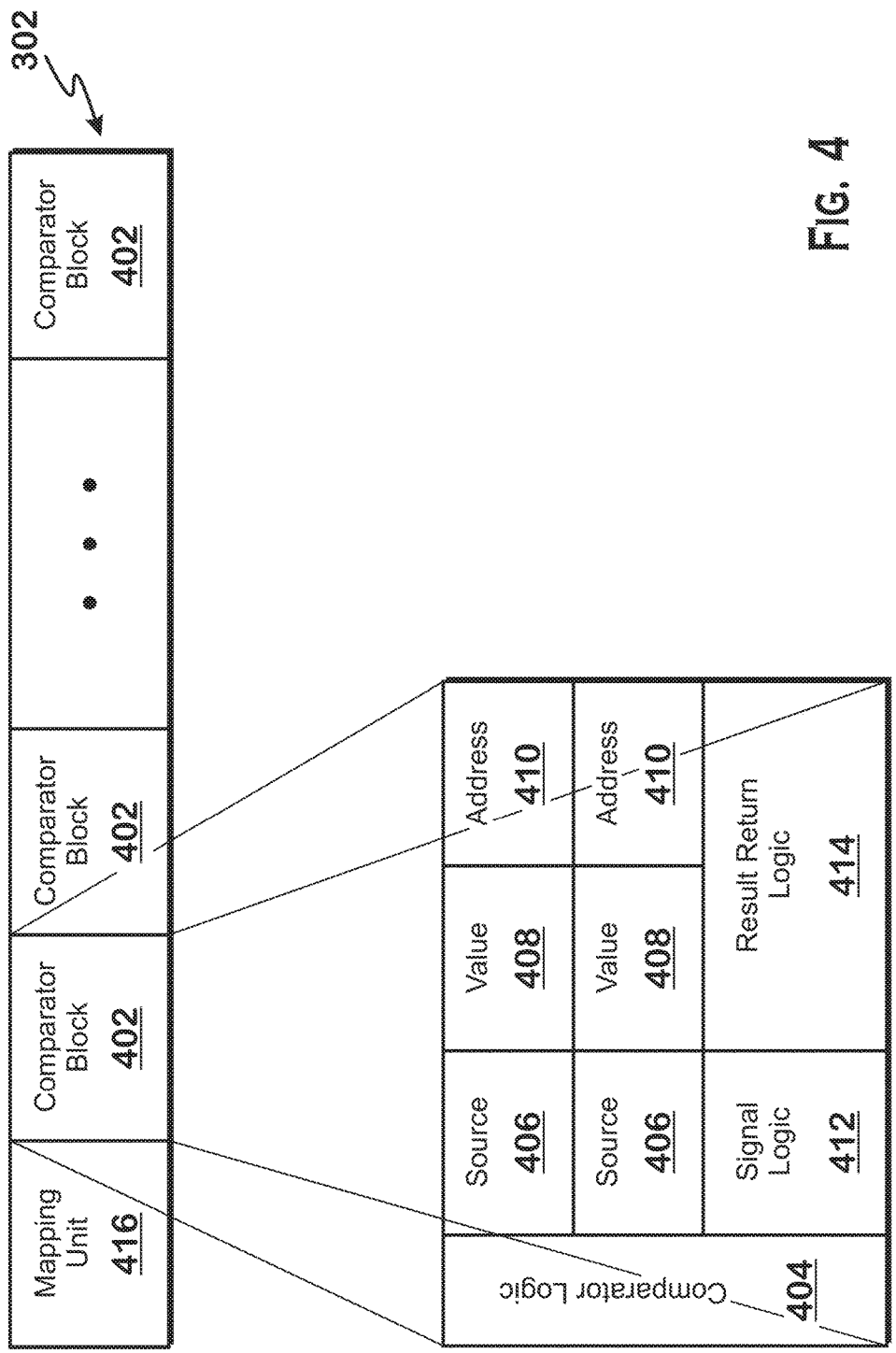
FIG. 4 is a block diagram illustrating additional detail of the comparator of FIG. 3.

FIG. 4 is a block diagram of the comparator 302 of FIG. 3, illustrating additional detail. As shown, the comparator 302 includes one or more comparator blocks 402 and a mapping unit 416. A comparator block 402 includes two source identification blocks 406, two value storage blocks 408, two address storage blocks 410, a signal logic block 412, a result return logic block 414, and a comparator logic block 404.

The source identification block 406 stores a work-item identifier, for each work-item from which values for comparison have been received, the work-item identifiers uniquely identifying each of the two work-items. The value block 408 stores the values ("V value") received from the work-items. The address block 410 stores the address ("A address") if used) from the work-item. There are two copies for each of the source block 406, the value block 408, and the address block 410, as these items are used once for each work-item. The signal logic block 412 includes logic configured to emit the trap signal discussed above with respect to the third and fourth compare instructions. The result return logic block 414 includes logic configured to return the result that indicates whether the comparison succeeded or failed as described above with respect to the first and second compare instructions. The comparator logic 404 includes logic for comparing the values stored in the value blocks 408 and the address blocks 410. The comparator logic 404 may include XOR gates arranged to perform such comparison function.

The mapping unit 416 maps data for incoming compare instructions to a particular comparator block 402 based on the pairing number. The mapping unit 416 may map such data in any technically feasible manner.

Note that although the address comparison feature has been described herein, the present disclosure contemplates an APD 116 that is not configured to support instructions that require address comparison. Thus, although shown with address blocks 410, these blocks may not be included if the APD 116 is not configured to support instructions for comparing addresses in addition to values. Similarly, the ADP 116 may be configured either only to support the return function or the signaling function. Thus, the signal logic block 412 and the result return logic block 414 are considered optional as well.

As described above, although the work-items that execute compare instructions with the same pairing value may execute simultaneously in the same wavefront in a single SIMD unit 138, such work-items may also execute at different times and/or in different wavefronts. If one such work-item issues an instruction that stores a value (and address if relevant) in a comparator block 402 before another such work-item issues an instruction that stores a value in the comparator block 402, then the comparator block saves the first value (and address if relevant) and waits to receive the second value (and address if relevant). Upon receiving the second value (and address if relevant), the comparator block 402 performs the comparison function and performs the appropriate action in response.

Note that although it is contemplated that the work-items that execute the compare instruction are executing the same program, the present disclosure also contemplates that work-items may execute different programs whose purpose it is to calculate the same number through different means. In such circumstances, the compare instruction described herein can still be used to compare values from both such work-items. However, both such work-items would not be able to execute simultaneously in the same SIMD unit 138 because both such work-items would not be executing identical programs.

Figure 5:
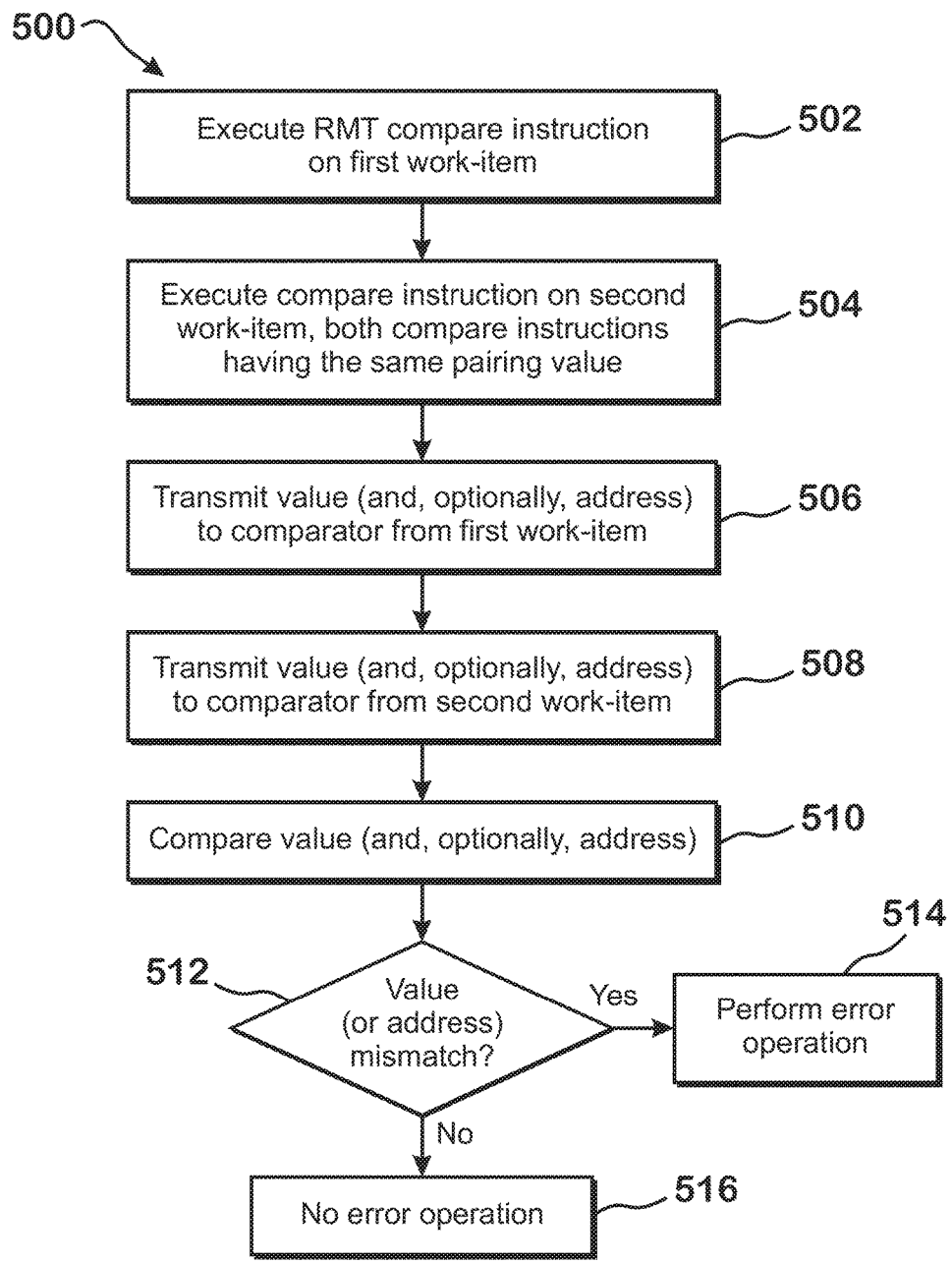
FIG. 5 is a flow diagram of a method for comparing two values produced within SIMD units of the compute unit illustrated in FIGS. 1-3.

FIG. 5 is a flow diagram of a method for comparing two values. Although described with respect to the system shown and described with respect to FIGS. 1-4, it should be understood that any system configured to perform the method, in any technically feasible order, falls within the scope of the present disclosure.

As shown, a method 500 begins at step 502, where a work-item executing on a SIMD unit 138 executes an RMT compare instruction. The RMT compare instruction may be one of the four instructions discussed above or may be another instruction configured to cause a comparator to perform comparison operations in accordance with the teachings provided herein. At step 504, a second work-item executes an RMT compare instruction with a pairing number that is the same as the pairing number of the first RMT compare instruction.

At step 506, the SIMD unit 138 executing the first work-item transmits the value, and, optionally, the address, if specified by the RMT compare instruction, to the comparator 302 for comparison. At step 508, the SIMD unit 138 executing the second work-item transmits the value, and, optionally, the address, if specified by the RMT compare instruction, to the comparator 302 for comparison. Note that steps 502 and 504 may be executed simultaneously if the two work-items are executing simultaneously or may be executed at different times. Similarly, steps 506 and 508 may be executed simultaneously or non-simultaneously.

At step 510, the comparator 302 compares the values and optionally the addresses. Step 510 may be performed by mapping the values (and, optionally, addresses) from both work-items to an appropriate comparator block 402 based on the pairing number, storing work-item identifiers in the source block 406, the values in the value blocks 408, and, optionally, the addresses, in the address block 410, and then comparing the values and optionally the addresses using the comparator logic block 404.

At step 512, if there is a value or address mismatch, then the method 500 proceeds to step 514 and if there is no value or address mismatch, then the method 500 proceeds to step 516. At step 514, the comparator block 402 performs an appropriate error operation depending on the specific RMT compare instruction issued, such as emitting a trap signal via signal logic 412 or transmitting a result via result return logic 404 to the work-items that triggered the RMT compare instruction. At step 516, no such error operation is performed.

Providing an RMT compare instruction reduces the complexity associated with creating a program for execution on SIMD-based hardware that performs redundant RMT techniques. Without such an instruction, a programmer would have to force work-items to run redundantly, to compare computations, and to handle the results of such comparison.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system for detecting processing discrepancies, the system comprising:
   a first execution unit configured to execute a first program that includes a first compare instruction specifying a first value to be compared and a first pairing value;
   a second execution unit configured to execute a second program that includes a second compare instruction specifying a second value to be compared and a second pairing value that is identical to the first pairing value; and
   a comparator configured to:
      responsive to the first pairing value being equal to the second pairing value, compare the first value to the second value, and
      perform a resulting action in response to the comparison, the resulting action being dependent on whether the first value is identical to the second value and indicating whether a processing discrepancy has occurred.

2. The system of claim 1, wherein:
   the first instruction specifies the first value by referring to a first register assigned to the first program and the second instruction specifies the second value by referring to a second register assigned to the second program.

3. The system of claim 1, wherein:
   the first instruction specifies a first address for comparison and for committing the first value and the second instruction specifies a second address for comparison and for committing the second value; and
   the comparator is further configured to compare the first address to the second address and,
      if the first address is equal to the second address, commit the first value to memory at the first memory address, or
      if the first address is not equal to the second address, not commit the first value to memory at the first memory address and perform the resulting action.

4. The system of claim 1, wherein:
   the first program is different from the second program.

5. The system of claim 1, wherein:
   the first program is identical to the second program.

6. The system of claim 1, wherein the first execution unit and the second execution unit are single instruction multiple data ("SIMD") processing units.

7. The system of claim 6, wherein:
   the first execution unit is the second execution unit and the first program executes simultaneously with the second program.

8. The system of claim 6, wherein:
   the first instruction executes as part of a different wavefront than the second instruction.

9. The system of claim 1, wherein the resulting action comprises one of returning an error code to the first execution unit and the second execution unit that indicates whether the first value is identical to the second value or emitting a trap signal if the first value is not identical to the second value.

10. A method for detecting processing discrepancies, the method comprising:
   executing a first program at a first execution unit, the first program including a first compare instruction specifying a first value to be compared and a first pairing value;
   executing a second program at a second execution unit, the second program including a second compare instruction specifying a second value to be compared and a second pairing value that is identical to the first pairing value;
   responsive to the first pairing value being equal to the second pairing value, comparing the first value to the second value; and performing a resulting action in response to the comparing, the resulting action being dependent on whether the first value is identical to the second value.

11. The method of claim 1, wherein:
the first instruction specifies the first value by referring to a first register assigned to the first program and the second instruction specifies the second value by referring to a second register assigned to the second program.

12. The method of claim 1, wherein:
the first instruction specifies a first address for comparison and for committing the first value and the second instruction specifies a second address for comparison and for committing the second value; and
the method further comprises comparing the first address to the second address and,
    if the first address is equal to the second address, committing the first value to memory at the first memory address, or
    if the first address is not equal to the second address, not committing the first value to memory at the first memory address and performing the resulting action.

13. The method of claim 10, wherein:
the first program is different from the second program.

14. The method of claim 10, wherein:
the first program is identical to the second program.

15. The method of claim 10, wherein the first execution unit and the second execution unit are single instruction multiple data ("SIMD") processing units.

16. The method of claim 15, wherein executing the first program and executing the second program comprises executing the first program simultaneously with and in the same execution unit as the second program.

17. The method of claim 15, wherein:
the first instruction executes as part of a different wavefront than the second instruction.

18. The method of claim 10, wherein the resulting action comprises one of returning an error code to the first execution unit and the second execution unit that indicates whether the first value is identical to the second value or emitting a trap signal if the first value is not identical to the second value.

19. A system for detecting processing discrepancies, the system comprising:
a graphics processing pipeline configured to accept graphics rendering commands and to deliver graphics processing tasks to one or more compute units for processing;
the one or more compute units configured to process the tasks from the graphics processing pipeline and from an external processor, wherein at least one of the one or more compute units includes:
    a first execution unit configured to execute a first program that includes a first compare instruction specifying a first value to be compared and a first pairing value;
    a second execution unit configured to execute a second program that includes a second compare instruction specifying a second value to be compared and a second pairing value that is identical to the first pairing value; and
a comparator configured to:
    responsive to the first pairing value being equal to the second pairing value, compare the first value to the second value, and
    perform a resulting action in response to the comparison, the resulting action being dependent on whether the first value is identical to the second value and indicating whether a processing discrepancy has occurred.

20. The system of claim 19, wherein:
the first instruction specifies a first address for comparison and for committing the first value and the second instruction specifies a second address for comparison and for committing the second value; and
the comparator is further configured to compare the first address to the second address and,
    if the first address is equal to the second address, commit the first value to memory at the first memory address, or
    if the first address is not equal to the second address, not commit the first value to memory at the first memory address and perform the resulting action.

* * * * *